(12) United States Patent
Griessbaum et al.

(10) Patent No.: US 7,307,582 B2
(45) Date of Patent: Dec. 11, 2007

(54) METHOD FOR DETERMINING A LEVEL OF MATERIAL WITH A TWO-WIRE RADAR SENSOR COMPRISING INTERMITTENTLY OPERATING CIRCUITRY COMPONENTS AND A TWO-WIRE RADAR SENSOR

(75) Inventors: Karl Griessbaum, Muehlenbach (DE); Winfried Rauer, Fischerbach (DE); Josef Fehrenbach, Haslach i.K. (DE)

(73) Assignee: VEGA Grieshaber KG, Wolfach (DE)

( * ) Notice: Subject to any disclaimer, the term of this patent is extended or adjusted under 35 U.S.C. 154(b) by 217 days.

(21) Appl. No.: 11/039,443

(22) Filed: Jan. 20, 2005

(65) Prior Publication Data
US 2005/0168379 A1    Aug. 4, 2005

Related U.S. Application Data

(60) Provisional application No. 60/542,066, filed on Feb. 4, 2004.

(51) Int. Cl.
*G01F 23/284* (2006.01)
*G01S 13/08* (2006.01)
*G01S 13/00* (2006.01)

(52) U.S. Cl. ............... 342/124; 342/118; 342/175; 342/195; 73/290 R; 73/304 R; 324/629; 324/637

(58) Field of Classification Search ........ 324/637–646, 324/629; 73/149, 290 R, 304 R, 304 C; 342/89, 90, 94, 118, 123, 124, 134–145, 175, 342/195, 202–204, 27, 28, 42–51, 104
See application file for complete search history.

(56) References Cited

U.S. PATENT DOCUMENTS

| | | | | |
|---|---|---|---|---|
| 3,740,640 A | * | 6/1973 | Ravas et al. | 342/175 |
| 4,755,740 A | * | 7/1988 | Loucks | 342/204 |
| 4,975,706 A | * | 12/1990 | Shrader | 342/202 |
| 5,083,861 A | * | 1/1992 | Chi | 342/134 |
| 5,126,745 A | * | 6/1992 | Steinhagen et al. | 342/51 |
| 5,207,101 A | | 5/1993 | Haynes | |
| 5,416,723 A | | 5/1995 | Zyl | |
| 5,465,094 A | * | 11/1995 | McEwan | 342/28 |
| 5,546,088 A | * | 8/1996 | Trummer et al. | 342/124 |
| 5,608,406 A | * | 3/1997 | Eberth et al. | 342/51 |
| 5,614,911 A | * | 3/1997 | Otto et al. | 342/124 |
| 5,790,014 A | * | 8/1998 | Campbell et al. | 342/44 |
| 5,793,309 A | * | 8/1998 | Nellson | 342/27 |
| 5,969,666 A | * | 10/1999 | Burger et al. | 342/124 |
| 6,169,706 B1 | * | 1/2001 | Woodward et al. | 342/124 |

(Continued)

FOREIGN PATENT DOCUMENTS

DE    3107444 A1    10/1982

(Continued)

Primary Examiner—Bernarr E. Gregory
(74) Attorney, Agent, or Firm—Fay Kaplun & Marcin, LLP (57) ABSTRACT

A method for determining a distance between a radar sensor and a reflection surface of a material comprising the following steps. The radar sensor is energized via a two-wire control loop which allows for data communication and an internal energy store. An echo profile is generated and analyzed to calculate the distance. During generation of the echo profile, the generation process is interrupted at least once to recharge the energy store via the two-wire control loop.

27 Claims, 7 Drawing Sheets

U.S. PATENT DOCUMENTS

| | | | |
|---|---|---|---|
| 6,445,338 B1 * | 9/2002 | Ohkubo | 342/104 |
| 6,535,161 B1 | 3/2003 | McEwan | |
| 6,597,309 B1 * | 7/2003 | Panton et al. | 342/134 |
| 6,864,833 B2 * | 3/2005 | Lyon | 342/124 |
| 6,906,660 B2 * | 6/2005 | Nakamura et al. | 342/118 |
| 6,943,640 B2 * | 9/2005 | Arlow | 342/203 |
| 2002/0030622 A1 * | 3/2002 | Ohkubo | 342/104 |
| 2004/0004905 A1 * | 1/2004 | Lyon et al. | 342/124 |

FOREIGN PATENT DOCUMENTS

| | | |
|---|---|---|
| DE | 298 15 069 | 8/1998 |
| DE | 10106681 A1 | 1/2003 |
| GB | 2094091 A | 9/1982 |

* cited by examiner

METHOD FOR DETERMINING A LEVEL OF MATERIAL WITH A TWO-WIRE RADAR SENSOR COMPRISING INTERMITTENTLY OPERATING CIRCUITRY COMPONENTS AND A TWO-WIRE RADAR SENSOR

PRIORITY CLAIMS

This application claims the benefit of U.S. Provisional Patent Application Ser. No. 60/542 066 filed on Feb. 04, 2004 which application is expressly incorporated herein, in its entirety, by reference.

TECHNICAL FIELD OF THE INVENTION

The invention relates to a method for determining a distance between a sensor and a reflecting surface of a material, to derive a level of material in a container by using a two-wire radar sensor with intermittently operating circuitry components. Moreover, the invention relates to a two-wire radar sensor to carry out the method.

Two-wire radar sensors, to which the invention is applicable, are radar sensors being equipped with a two-wire control loop, providing for the power supply as well as for data communication. Further, the inventive method of determining a distance between a radar sensor and a reflecting surface of a material refers to the pulse radar technique. For this kind of measurement, a radar sensor is employed, having a transmission unit, generating high frequency pulses, emitting these with a preset repetition rate (PRF=pulse repetition frequency) via an antenna towards the material to be measured, contained, e.g. in a container. The signals are reflected at the surface of the material to be measured, and are received via the same or another antenna, to be processed in a receipt unit. For this, the receipt unit comprises a sampling circuit, by means of which the receipt signal of a high frequency is transformed into a signal of low frequency. By means of these low frequent receipt signals, the pulse round trip time is determined, and from this, the distance to the material or the level of material can be calculated.

BACKGROUND OF THE INVENTION

For continuous determination of a level of material in containers, filled e.g. with liquids or with bulk material, mostly sensors are employed being based on radar technology, measuring the round trip time of microwaves from the sensor to the surface level of the material to be measured and back. Microwaves, lying in a frequency range from approximately 1 to 100 GHz, are radiated via antennas. The microwaves are reflected on a surface of the filling good and are received again by the antenna. Besides, devices are known in prior art, using a wave guide, to guide the wave from the sensor to the surface of a material to be measured. The reflection of the waves at the surface of the material is based on the change of the propagation impedance for the wave at this point.

For the determination of the round trip time of a wave, different radar techniques are known. The most common methods used are based on the one hand on the pulse radar technique, and on the other hand, on the frequency modulated continuous wave radar technique (FMCW). When using frequency modulated continuous wave radar technique, the round trip time is determined indirectly via the transmission of a frequency modulated signal and formation of the difference between transmitted and received momentary frequency. Pulse radar technique, however, uses short microwave pulses, so-called bursts, and determines the direct time period between transmission and receipt of the pulses. From this time period, the distance between sensor and surface of the material, and therefore the level of material, can be derived.

From GB 2 094 091 A equivalent to DE 31 07 444 C2 and U.S. Pat. No. 4,521,778 A a high resolution coherent pulse radar system is known in which two high stability pulse series differing only slightly in their pulse repetition frequency are produced in a transmitter. Both series of pulses are converted into microwave pulse packets, one pulse series being processed into transmitting pulses and the other into scanning pulses for a time expansion process. Mixing of the scanning pulses and received echo pulses in a mixer results in the formation of an intermediate frequency signal and in the time expansion of echo pulses. The received signal bandwidth is thus reduced at the intermediate frequency stage. This method is also called sequential sampling or equivalent time sampling (ETS).

In DE 298 15 069 U1 a sampling circuitry for equivalent time sampling is disclosed in connection with a level measuring sensor using a guided microwave. This sampling circuitry comprises two oscillators, one of the oscillators is controlled in his frequency such that a measured frequency difference corresponds with a target value.

An apparatus for determining the filling level of a product in a container with a transmission unit which generates high frequency signals and emits them at a predetermined pulse repetition frequency in the direction of the surface of the filled product is known from DE 101 06 681 A1 equivalent to US 2002/0133303 A1. Here, the signals are reflected by the surface of the filled product and are received by the receiving unit. A delay circuit transforms the high frequency signals/reflected signals into low-frequency signals in accordance with a predetermined translation factor and with an evaluation unit which determines the filling level of the product in the container on the basis of delay time of the signals. The delay circuit includes: a transmission oscillator, a sampling oscillator, a digital sampling circuit, and a closed-loop/open-loop control unit.

In U.S. Pat. No. 6,680,690 B1 it is disclosed a radar level gauge for measuring a level of a surface of a product in a tank having a two-wire process control loop. It comprises an output circuitry coupled to the two-wire process control loop for setting in the loop a desired value of a loop current corresponding to the product level, a power supply circuitry coupled to the two-wire process control loop for receiving power from the loop and being a source of power for a microwave source, a microwave receiver, a measurement circuitry and the output circuitry and including a converter for transferring power from the loop to said power supply circuitry by means of feeding a first current from the loop to the power supply circuitry, a current generator included in said output circuitry for generating in parallel to said first current a second current in the loop for maintaining said loop current at a value corresponding to said product level and a sensing circuit for determining the value of said second current and having an output indicative of the value of said second current.

Finally, U.S. Pat. No. 5,672,975 discloses a two-wire level transmitter for use in a process application which measures the hight of a product in a tank. Here, an output circuitry coupled to the two-wire process control loop transmits information related to a product height over the loop.

A widely-used standard in measurement and control technology is the so-called two-wire control loop. In general, this means that both the supply of power to the apparatus as well as data communication, e.g. the output of a measured value, results via the same pair of wires. Common standards are the 4-20 mA two-wire standard, as well as various other standards, according to which the data communication of the apparatus results via signals digitally modulated onto the pair of wires. However, two-wire control loops are limited in providing sufficient energy for the measuring devices used in the field.

From U.S. Pat. No. 6,014,100, a two-wire radar sensor is known, the power consumption of which exceeds the above-mentioned value at least in one phase of the measurement cycle. In other phases of the measuring cycle, the power consumption lies below the limit. By means of buffering energy in phases of low power consumption, and supplying the energy stored in phases of high power consumption, a two-wire operation is enabled.

Measuring cycle means the time between determining two subsequent measurement results for the level of material. The measuring cycle can be, according to the above-mentioned prior art, subdivided into several phases of different power consumption: In a first measurement phase, in which the microwave pulses are transmitted and received, are dilated by the sampling process, and are represented as an echo profile of the measurement range, the power consumption is at a maximum. A second phase is characterized by a minimum power consumption, which is achieved by switching off the transmit/receipt circuit and maintaining an analyzing unit in an energy saving standby mode. In a third phase, during which the echo analyzing unit selects and analyzes the echo generated in the echo profile, the power consumption also clearly is below the maximum. The second and third phase can be interchanged in their order, or can be nested into each other.

The buffering of the electrical energy e.g. in capacitors during the second and third phase, in which the power consumption is low, enables for a power consumption lying clearly above the limit set by the two-wire control loop during the first phase. Latest developments in the field of radar level sensors aim at miniaturizing the electronic circuit, and thus, the entire apparatus. On the other hand, an improved signal sensitivity is desired, to also detect bulk material reflections within the container precisely and reliably, even if conditions are unfavorable or at large measuring distances.

Higher signal sensitivity can be achieved by measures as increasing the transmission performance, prolonging the time period of the transmission pulses, amplifying the microwave receipt signals by means of a low noise amplifier, and/or increasing the dilation factor. For the two-wire control operation of such an improve sensor, however, the problem arises that the power consumption will rise dramatically during the first phase of measurement. Moreover, the time period for carrying out a complete measurement within the first phase will increase due to the increased dilation of the echo profile and the broadening of the possible measurement range. By extension of the second phase, it could, however, be provided for the average power consumption not exceeding the limit set by the two-wire control, but for covering the comparatively high power consumption in the first measuring phase, large energy stores would be necessary, which cannot be united with circuit miniaturization. Shortening of the first measuring phase can be excluded, because according to prior art, always a complete echo profile of the whole measuring range has to be generated, starting with a reference echo in the close-up range up to the distance to be measured maximally. If a large measuring range and a high dilation factor are used, then, a comparatively long time period results, during which a high power consumption has to be covered without any interruptions.

SUMMARY OF THE INVENTION

Implementations of the invention can include one or more of the following features. According to an aspect of the invention, a method for determining a distance between a radar sensor and a reflection surface of a material using a pulse measurement process, is provided. The radar sensor is energized via a two-wire control loop, which also allows for data communication, and an internal energy store. The pulse measurement process comprises at least two phases, whereby in a first phase, an echo profile is generated, and in a second phase, the echo profile is analyzed, to calculate the distance. The first phase, namely the measurement phase, is interrupted at least one time, to recharge the energy store via the two-wire control loop.

According to another aspect of the invention, the first phase comprises at least two partial phases, whereby respective partial echo profiles corresponding to the partial phases, are generated. During the first phase, more current is required than the two-wire control loop alone, which provides e.g. a current of 4-20 mA, is able to provide. The echo profile comprises both the reference signal as well as echo signals, whereby a timer is used, to store the sampled signal values of the sampling signals in respective storage cells, given by the timer counter reading.

By subdividing the first measurement phase, during which the power consumption of the sensor is at a maximum, into at least two shorter partial phases, it is possible, to also use small energy stores which can cover the power consumption of the sensor at any time, and thus, allow for a two-wire control operation. The discharge of the energy store in the partial phases is not that high due to the shortened time period of a partial phase compared to the total first phase. The subsequent second or even third phases, being characterized by a low power consumption, enable a recharge of the energy store. The problem existing in prior art, to not be able to interrupt the first phase of a measurement, is solved by generating the constant reference echo at the beginning of each partial phase again.

According to an aspect of the invention, for generating the partial echo profiles, a transmit/receipt unit of the sensor is activated, which is deactivated upon interruption of the first phase, whereby the point of time of the interruption is selected such that the energy store is not discharged completely, whereby the duration of the interruption is selected such that the energy store is charged sufficiently, to enable a further activation of the transmit/receipt unit. During the interruption, the transmit/receipt unit is in a standby mode during the interruption.

As mentioned already above, according to another aspect of the invention, prior to generating each partial echo profile, a reference pulse is generated and stored, to define a uniform temporal reference point of the partial echo profiles. Another aspect of the invention provides for generating and storing a differential signal simultaneously with each partial echo profile, to define a uniform temporal reference point of the partial echo profiles. According to another aspect of the invention the at least two partial echo profiles are combined to a total echo profile, using their respective uniform temporal reference points. A total measurement range of the sensor is subdivided into at least two partial measurement ranges, corresponding to respective partial echo profiles according to one more aspect of the invention, whereby the first phase is subdivided into two partial phases, and whereby each partial phase corresponds to one half of the measurement range.

The reference echo used as uniform temporal reference point could commonly be derived from the sensor front end of the transmission pulse, and the partial reflection of the transmission pulse at the antenna or the antenna coupling could be used as reference echo. Therefore, it always appears chronologically prior to the echo of the material to be measured. In a simple case, the division of the first measurement phase could result such that the first partial phase comprises the echo profile as well as the subsequent measurement range from e.g. 0 m to 20 m distance to the material. This echo profile should be buffered.

During the second partial phase, first the echo profile of the reference echo is generated and stored; this echo profile should also be buffered. The sensing of the measurement range up to 20 m is suspended. In the measurement range between 20 m (minus an overlapping region) and e.g. 40 m, the sensing is activated again for generating and storing of the second partial echo profile.

According to an aspect of the invention, two adjacent partial echo profiles are overlapping partially, whereby the overlapping section is analyzed by averaging the measurement values of the respective partial echo profiles, coinciding in the overlapping section. I. e., finally, the two echo profiles stored, comprising the two ranges from 0 to 20 m and from 20 m to 40 m, are combined such that they fit together with respect to time, in that the two reference echos are brought into coincidence. The resulting echo profile of the total measurement range contains the values stored either of the first or the second partial profile, depending on the measurement range, and in the overlapping region of both partial profiles, an average value of both.

According to another aspect of the invention, with each partial echo profile, a differential signal is generated and stored simultaneously, to define a uniform temporal reference point of the partial echo profiles. The combination of the partial echo profiles then is based on the differential signal, which is generated by mixing the signals of the oscillators, respectively generating the transmission signal and the sampling signal. Then, it would not be necessary, to also use the reference echo signal, to make the partial echo profiles coincide. All other steps of combining the partial echo profiles correspond to the method previously described in connection with the use of the reference echo signal as a uniform temporal reference point.

Another aspect of the invention is that the duration of the timer period corresponds to the measurement range and the level of material in a container is calculated from the distance determined.

A further aspect of the invention is a radar sensor, using a pulse measurement process for determining a distance, whereby the radar sensor is provided with a power supply unit with a two-wire control loop and an internal energy store, energizing the radar sensor, whereby the radar sensor further comprises a transmit/receipt circuit, a frequency control unit, and a microcontroller, whereby the microcontroller controls the voltage of the energy store during a first phase of the pulse measurement process, in which the echo profile is generated, by activating/deactivating the transmit/receipt circuit, whereby the first phase is subdivided into at least two partial phases.

According to another aspect of the invention the energy store of the radar sensor is a capacitor or an accumulator, and the two-wire control loop provides a current in the range of 4-20 mA.

In a further aspect of the invention, a method for determining a distance between a two-wire radar sensor and a reflection surface of a material by means of a pulse measurement process is provided, the pulse measurement process comprising at least two phases, whereby a first phase is a measurement phase for generating an echo profile, and a second phase is an analysis phase for calculating the distance to be determined from the data retrieved from the measurement phase, whereby the first phase comprises the following steps:
  activating a transmit/receipt circuit;
  generating and storing a temporal reference point by generating a reference pulse;
  generating and storing a first partial profile of the echo profile in the first phase, corresponding to a first measurement range of the sensor;
  deactivating the transmit/receipt circuit until the energy store is recharged at least partially;
  activating the transmit/receipt circuit;
  generating and storing of the temporal reference point by generating the reference pulse;
  generating and storing a second partial profile of the echo profile, corresponding to a second partial measurement range of the sensor;
  deactivating the transmit/receipt circuit until the energy store of the sensor is recharged at least partially.

In another aspect of the invention the second phase of the method comprises the following steps:
  combining the two partial echo profiles to a total echo profile covering the entire measurement range by means of the respective temporal reference points;
  evaluating the round trip time of the echo in dependency of the reference pulse and calculating the distance between the sensor and the reflecting surface of the material by means of a microcontroller.

In another aspect of the invention, the partial echo profiles overlap in the regions being adjacent to each other, whereby the measured values respectively corresponding to each other in the overlapping section are averaged.

In one further aspect of the present invention, a method for determining a distance between a two-wire radar sensor and a reflection surface of a material by means of a pulse measurement process is provided, the pulse measurement process comprising at least two phases, whereby a first phase is a measurement phase for generating an echo profile, and a second phase is an analysis phase for calculating the distance to be determined from the data retrieved from the measurement phase, whereby the first phase comprises the following steps:
  activating the transmit/receipt circuit;
  generating, verifying, and storing a differential signal by means of a microcontroller; the frequency of the differential signal corresponding the frequency difference of an oscillator for generating transmission pulses and an oscillator for generating sampling pulses;
  generating and storing a reference pulse and a first partial echo profile, corresponding to a first partial measurement range of the sensor;
  deactivating the transmit/receipt circuit until the energy store, energizing the transmit/receipt circuit, is recharged at least partially;
  verifying the differential signal by means of the controller;

generating and storing a second partial echo profile, which corresponds to a second partial measurement range of the sensor.

In a further aspect of the invention, the second phase of the method comprises the steps of:
combining the partial echo profiles to a total echo profile covering the entire measuring range by using the respective differential signal of the partial echo profiles;
determining the round trip time of the echo in dependency of thereference pulse and calculating the distance between the sensor and the reflecting surface of the material by means of the microcontroller.

Another aspect of the inventive method is that the partial echo profiles overlap in the regions being adjacent to each other, whereby the measured values respectively corresponding to each other in the overlapping section are averaged. A slope of the differential signal is serving as reference point for the beginning of a respective partial echo profile.

According to one more aspect of the invention, a method for determining a distance between a radar sensor and a reflection surface of a material using a pulse measurement process is provided, the radar sensor being energized via a two-wire control loop, also allowing for data communication, and an internal energy store, whereby the pulse measurement process comprises at least two phases, whereby in a first phase, an echo profile is generated, and in a second phase, the echo profile is analyzed, to calculate the distance to be determined from the data retrieved by the measurement, whereby the first phase is interrupted at least one time, to recharge the energy store, whereby the first phase comprises at least two shorter partial phases, in which respective partial echo profiles are generated, whereby during the first phase, more energy is required than the two-wire control loop is able to provide, and whereby with each partial echo profile, a uniform temporal reference point is generated.

According to another aspect of the invention the first partial echo profile, being of a first amplification, comprises a reference pulse, and the second partial echo profile, being of second amplification, comprises pulses of the reflections of the surface of the material to be measured, whereby the second amplification is larger than the first amplification.

One further aspect of the invention is a radar sensor, using a pulse measurement process for determining a distance, whereby the radar sensor is provided with a power supply unit with a two-wire control loop and an internal energy store, energizing the radar sensor, whereby the radar sensor further comprises a microcontroller, the microcontroller controlling the voltage of the energy store during a first phase of the pulse measurement process, in which the echo profile is generated, by activating/deactivating the transmit/receipt circuit, and interrupting the first phase at least one time, to recharge the energy store. The energy store can be a capacitor or an accumulator, and the two-wire control loop provides an energy supply in the range of 4-20 mA.

The radar sensor comprises mixing means, being connected to mix the output of a first oscillator in the frequency control unit, generating transmission pulses, and the output of a second oscillator in the frequency control unit, generating sampling pulses, to generate a differential signal.

BRIEF DESCRIPTION OF DRAWINGS

Exemplary embodiments of the present invention will now be described by way of example with reference to the accompanying drawings, in which.

DETAILED DESCRIPTION OF EXEMPLARY EMBODIMENTS OF THE PRESENT INVENTION

Figure 1:
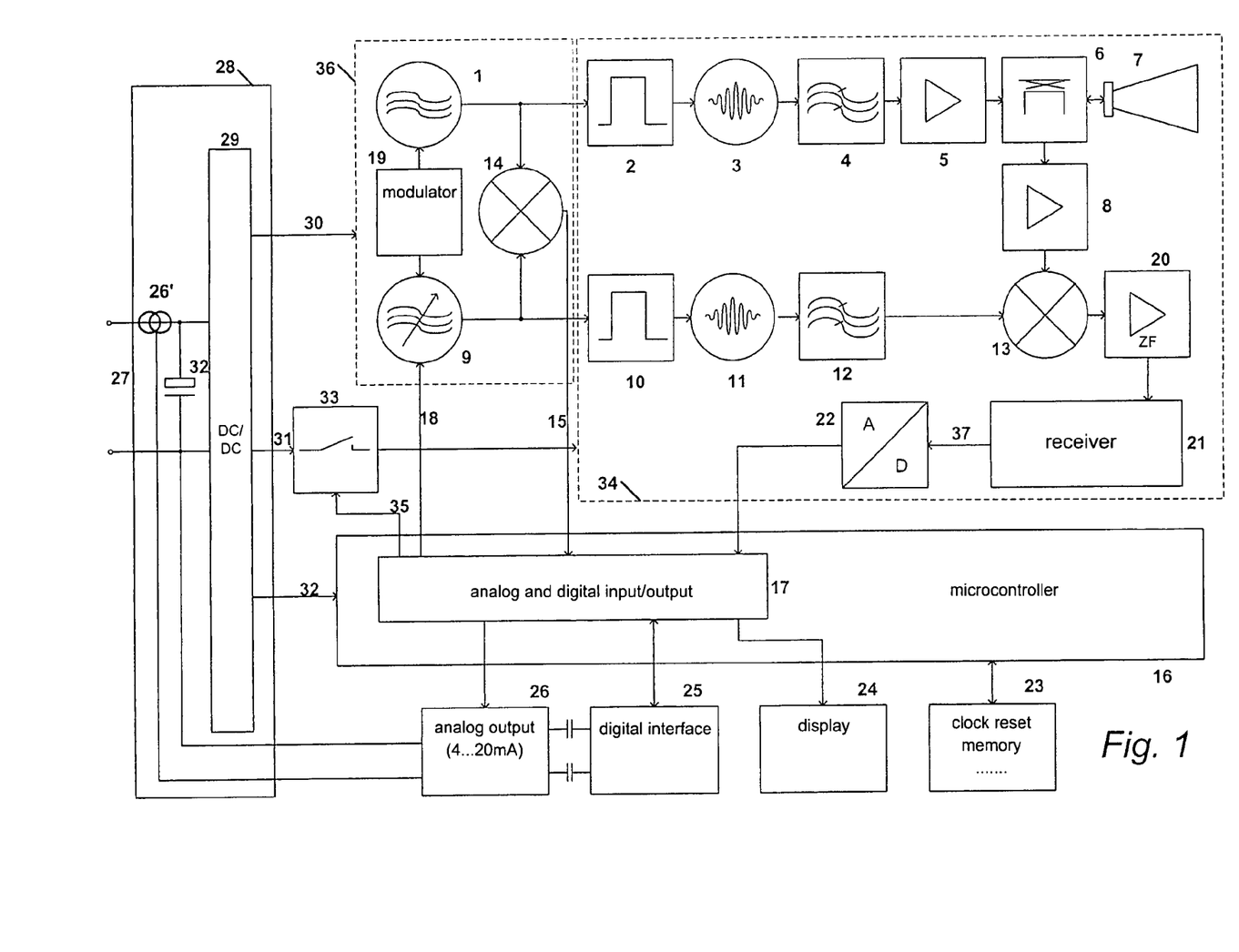
FIG. 1 is a block diagram of a two-wire radar sensor used for level detection of a material in a container.

FIG. 1 shows a block diagram of a radar sensor for determining a level of material in a container. A stable oscillator 1, e.g. a quartz oscillator, generates a transmission clock pulse, triggering a microwave pulse generator 3 for generating a transmission pulse via a slope steepening pulse former 2. After filtering through a bandpass filter 4, and amplification in amplifier 5, the transmission pulse is directed by the directional coupler 6 to antenna 7. After receipt of the reflected transmission pulse, this receipt pulse is coupled by antenna 7 via directional coupler 6 to the amplifier 8 (low noise amplifier).

The tunable oscillator 9, e.g. also a quartz oscillator, generates a sampling clock pulse, triggering a microwave pulse generator 11 via the pulse former 10. These microwave sampling pulses are directed via the bandpass filter 12 to the input of mixer 13. At the other input of the mixer 13, there is the amplified receipt signal. By means of the known sampling process, at the output of the mixer 13, a IF-echo profile results, being the dilated copy of the receipt signal. Because of the non-ideal isolation of the directional coupler, part of the transmission pulse generated by the microwave pulse generator, is coupled directly to the amplifier 8, and thus, to the receipt branch, instead of to the antenna.

This part of the transmission signal, which in fact is misguided, could be used as so-called reference pulse for marking of a distance zero point. Both oscillators 1 and 9 should have a slight constant frequency shift, to ensure the sequential sampling of the receipt signal by the sampling signal. For this purpose, a differential signal 15 is generated in mixer 14 from both oscillator signals. The differential signal, the frequency of which corresponds exactly to the frequency difference of the two oscillators 1 and 9, arrives at the analog and digital input/output interface 17 of microcontroller 16.

The interface 17 can comprise input/output ports, A/D and D/A converters. Microcontroller 16 is enabled via the interface, to determine the frequency of differential signal 15, e.g. in that slopes of the differential signal actuate an internal timer of the microcontroller and stop the internal timer after lapse of the period. The microcontroller compares the period duration to a set value previously determined, and a frequency tuning signal 18 is output via the interface which is derived from the difference of the set value and the measured value. This frequency tuning signal 18 shifts the frequency of the oscillator such that the difference between set value and difference frequency measured is as small as possible.

For the sake of completeness, it should be mentioned that the two oscillators 1 and 9 can be modulated commonly by modulator 19, to suppress e.g. external interfering signals and echo signals, the round trip time of which is larger than the period duration of the transmission clock pulse. The dilated echo profile produced by mixer 13, arrives at receiver 21 after amplification by IF amplifier 20. It is known to the person skilled in the art, how to construct such a receiver 21; therefore, this is not explained in further detail here. It should be noted only that here, amplifier, filter, logarithmizing means, and envelope detector can be comprised. The output signal 37 of the receiver, e.g. being provided as a logarithmized envelope signal of the echo profile is digitized by the A/D-converter 22 and the digitized values are transmitted via interface 17 to microcontroller 16, and are stored in a memory 23 by the latter. The digitized echo profile stored in the memory completely in the first phase of a measuring cycle, is analyzed in a further phase by the microcontroller.

This means that the microcontroller identifies individual echos within the echo profile and evaluates them mutually, to eventually identify the echo itself, resulting from the reflection at the surface of material to be measured, and to measure it with respect to its round trip time. The measuring of the round trip time refers to the reference pulse mentioned above. The value of the round trip time of the echo derived therefrom, enables the calculation of the distance between the sensor and the surface of the material to be measured, or the level of material in a container, respectively, using the previously known height of the container.

This information can be displayed via interface 17 on a display 24 and/or can be output via digital interface 25 or analog interface 26, 26', respectively. Two-wire line 27 does not only transmit information concerning the level of material, but rather also supplies energy to the sensor in a known manner. The analog output of information is e.g. based on the known standard of a 4 . . . 20 mA current signal. A digital information modulated by the digital interface does not only provide for the output of level information, but rather allows for the bidirectional communication between sensor and switch room or primary process control unit (not shown).

Energy being provided via two-wire control line 27 to the sensor is supplied within the power supply unit 28 by a DC/DC converter 29 as controlled output voltages 30, 31, 32 to the individual components of the sensor. To provide sufficient power in phases of increased power consumption, in phases of low power consumption, energy is stored in an energy store 32. Energy store 32 could be a capacitor whereby the stored energy is proportional to the capacity and the squared charging voltage. The complete discharge of the energy store during the phase of increased power consumption is not possible, because otherwise the input voltage of the DC/DC converter would drop to zero. The actual energy to be extracted depends on the difference of the final value of the charging voltage and the voltage, according to which the DC/DC converter 29 still maintains the control of its output voltages.

The larger the difference of the two voltage values is, the more energy can be extracted (with square dependency). Therefore, the energy store should be arranged at the input of the DC/DC converter instead of its output. The converter is able to control voltage changes occurring at the input over a wide range, whereas voltage changes due to energy store discharge at its outputs are only to a small extent admissible, in that the components being supplied with energy thereby are operated within their given voltage ranges.

For consumer loads having a high power consumption, circuitry is provided to interrupt the supply during certain phases, to save energy. In FIG. 1, this is illustrated by switch 33, being able to interrupt the supply via feeder 31 to the components of circuit 34 comprising the transmit/receipt circuit 34. This is controlled by control line 35, which in turn is controlled by microcontroller 16 via its interface 17. A further possibility (not shown), to save energy would be to deactivate frequency control unit 36 via a switch in feeder 30. This component could, however, be constructed in a very energy saving manner, and thus, the control of the frequency difference operates more reliably if not interrupted, it should be operated continuously without any breaks. The circuit unit of the microcontroller and its periphery could be switched into a standby mode saving energy, by the controller itself. This is the reason why no switch is necessary in the feeder 32.

Figure 2:
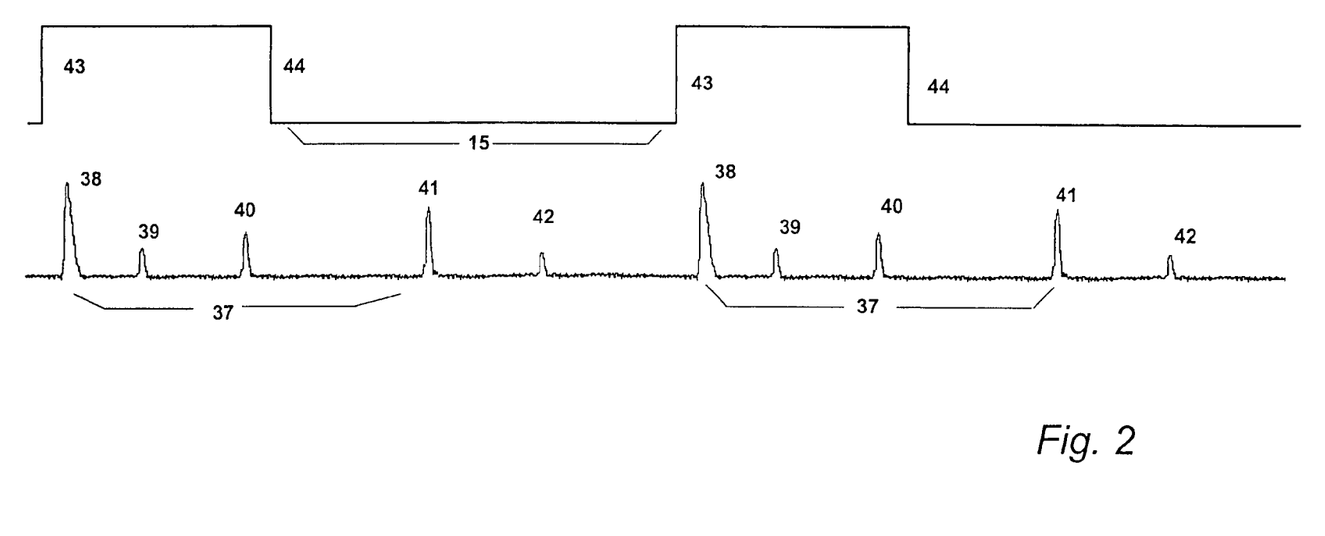
FIG. 2 is a timing diagram of an echo profile as well as a differential frequency signal of the sensor of FIG. 1.

In FIG. 2, the run of signal 37 should illustrate, how the logarithmized echo profile could look like at the output of the receiver 21. It always comprises the reference pulse 38, as described above, and possibly further echoes 39 to 42, which could be interfering reflections within the container and the reflection of the material in the container. After lapse of a certain time period, being predetermined by the transmission clock and the factor of dilation, limiting the maximal measurement range of the sensor, the echo profile is repeated. By determining the round trip time of the echo, starting from reference pulse 38, the determination of the distance between the sensor and the associated reflection surface is enabled. It should be obvious that without the presence of reference pulse 38, only mutual distances between reflections 39 to 42 could be determined, but not, however, their distances to the sensor. Due to this dependency of the round trip time measurement with respect to the reference pulse, in prior art it was always necessary, to generate and store a complete echo profile within one measurement cycle without any interruptions, starting with the reference pulse and ending with the maximum measuring distance.

Simultaneously with generating the echo profile 37, the differential signal 15 is created by the mixer 14, having the same period duration as the echo profile 37. It is known to the person skilled in the art, to construct the mixing means such that the differential signal has steep slopes 43 and 44. One of the two slopes, slope 43, commonly appears chronologically prior to the reference pulse and indicates the, coincidence, i.e. the phase consistency of the two oscillators 1 and 9. The chronological position of the second slope 44 depends on the operating mode of the mixer 14.

Figure 3:
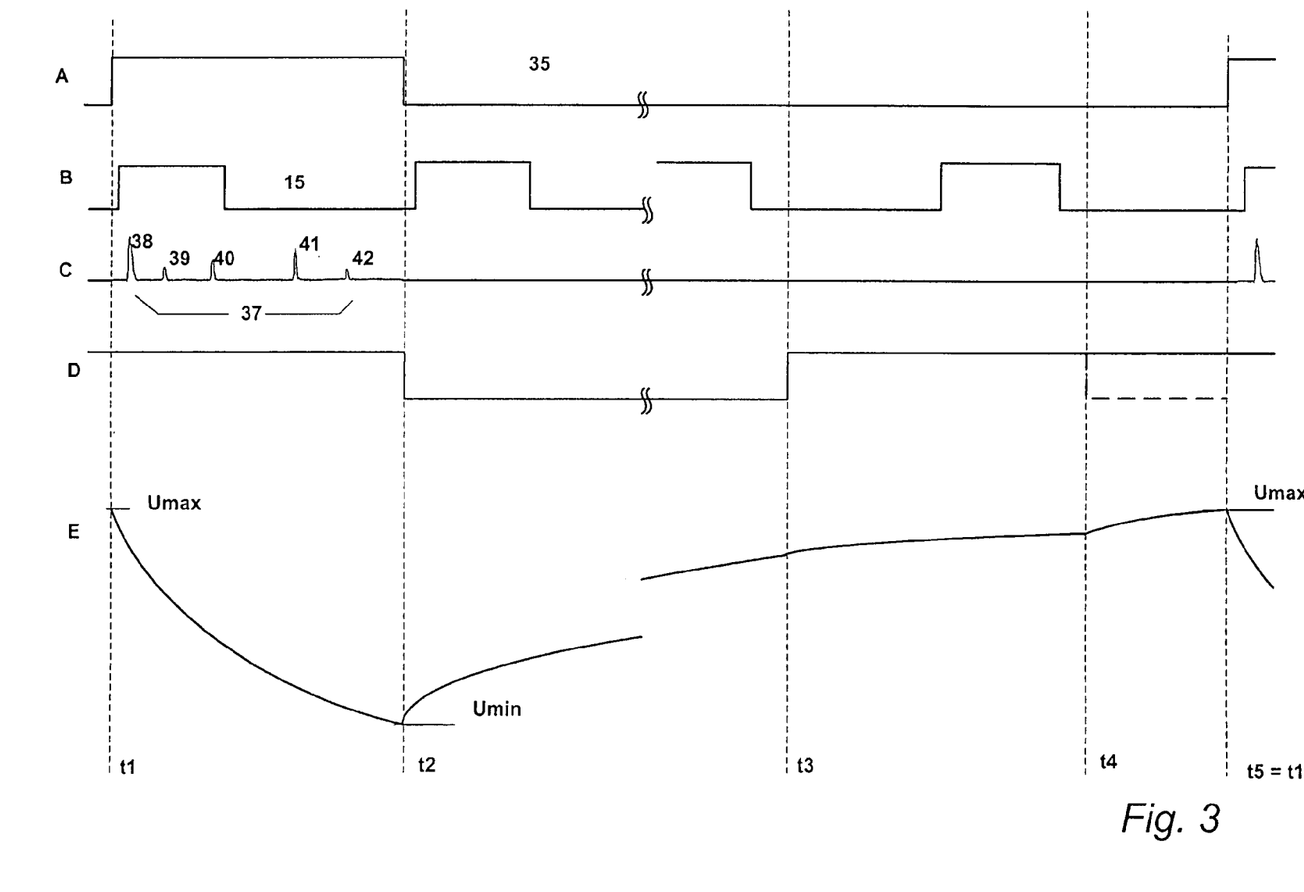
FIG. 3 is a timing diagram of different signals within the sensor shown in FIG. 1 operated according to prior art.

FIG. 3 shows various signals within the radar sensor appearing in one measurement cycle, starting at t1 and ending at t5 and after this, being repeated. Line A shows the control signal 35 of switch 33, switching the supply for the transmit/receipt unit 34. In the first phase at t1 until t2, the supply is switched on, and the echo profile 37 including reference pulse 38 as well as echoes 39 to 42 are generated, sensed, and stored. In line B the associated differential signal 15 is illustrated. Line D indicates the internal signal of the microcontroller, which can switch the microcontroller and its periphery into a standby mode. During the first phase, the microcontroller is not in standby mode. In line E, the charging voltage of the energy store 32, namely capacitor 32, is plotted. In the beginning of the measurement cycle, the charging voltage is at a maximum value of $U_{max}$. During the first phase, the power consumption of the sensor is highly increased, and the capacitor is discharged continuously until it reaches the voltage $U_{min}$.

This is the reason why the second phase between t2 and t3 is interrupted by a break, during which both the microcontroller 16 as well as the transmit/receipt unit 34 are deactivated or in standby mode, respectively. Due to this, the voltage at capacitor 32 rises again. At a certain point of time t3, the third phase starts, in which the microcontroller 16 is active again, to analyze the echo profile and to determine the level value. At t4, however, it would be possible to start another phase, in which the microcontroller is in standby mode, such that the capacitor could reach its maximum charging voltage $U_{max}$ again. Instead of the shown sequence, phases two and three could also be exchanged chronologically or be nested into each other. However, according to current prior art, the first phase cannot be interrupted due to the reasons mentioned above. This results in the voltage dropping below a value, according to which the DC/DC converter cannot maintain its output voltages anymore due to a limited storage capacity of capacitor 32, high power consumption of transmit/receipt unit 34, and long duration between t1 and t2 due to a high dilation factor. Therefore, according to this prior art, a two-wire operation of the sensor is not possible.

Figure 4:
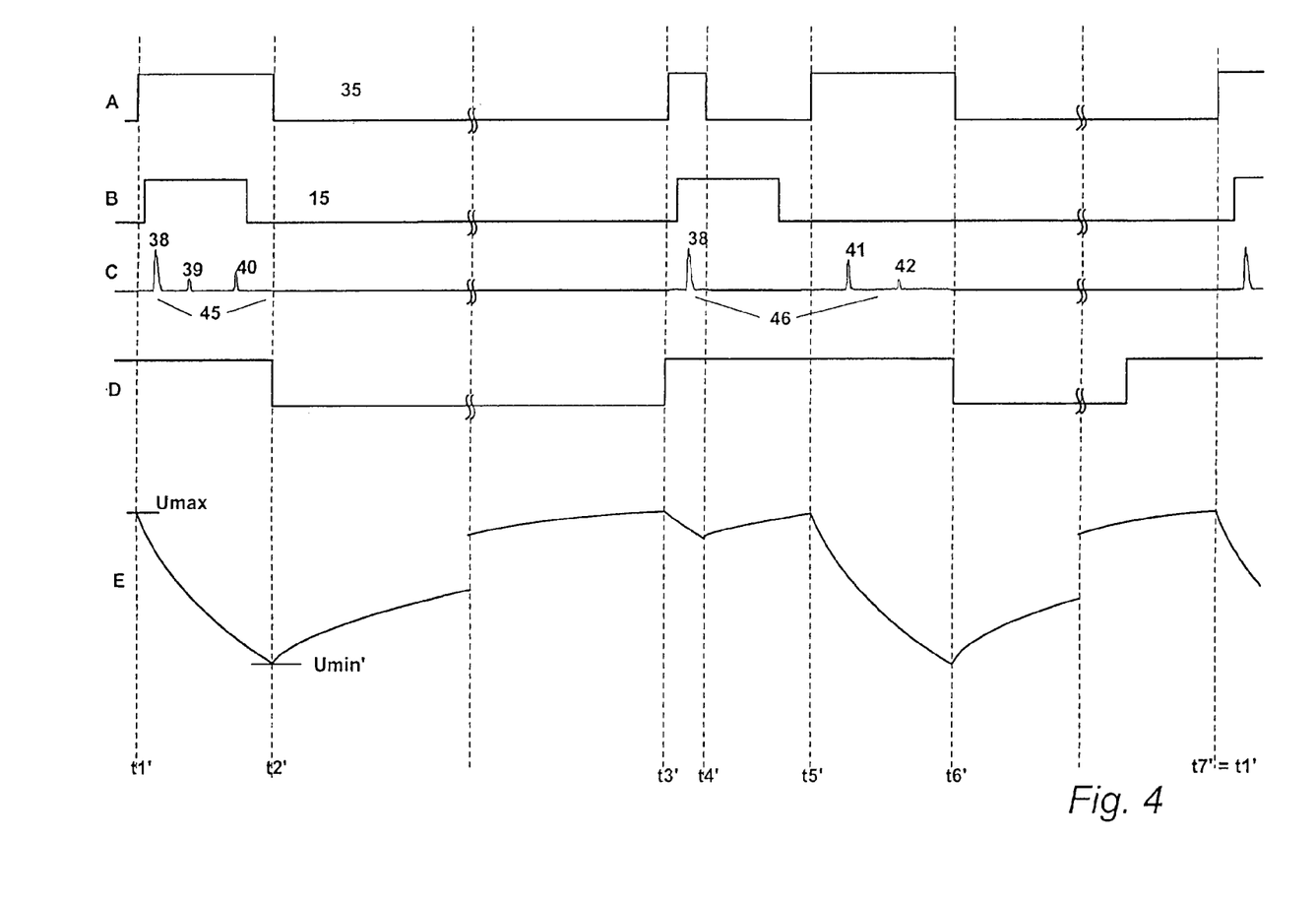
FIG. 4 is a timing diagram of different signals within the sensor of FIG. 1 operated according to the inventive method.

FIG. 4 shows the same signals as FIG. 3 in the same order, but, however, modified in their chronological sequence according to the invention. Here, the first phase is subdivided into two ore more partial phases, being interrupted by breaks. The first partial phase starts at the beginning of the measurement cycle at the point of time t1' and lasts until t2'. During this period the transmit/receipt unit 34 as well as microcontroller 16 are activated. In contrast to FIG. 3, the period is reduced to half of it. The partial echo profile 45 contains half of the measurement range with reference pulse 38 and the two echos 39 and 40. The voltage at capacitor 32 drops to the value $U_{min'}$ starting from maximum voltage $U_{max}$. However, $U_{min'}$ clearly lies above the value for $U_{min}$ shown in FIG. 3. After this break until t3', the second partial phase starts, ending at t6'. This, in turn, is again interrupted between t4' and t5'. In the time between t3' and t4' the transmit/receipt unit 34 is activated, and the reference pulse 38 is generated and stored. After this, unit 34 is deactivated to save energy again until t5', indicating approximately half of the measurement range within the echo profile. From this point of time t5' until t6', the partial echo profile 46 is generated and stored, representing the second half of the measurement range. Due to this, the voltage at capacitor 32 drops again to $U_{min'}$. Between t6' and t7', a further break interrupts this period and the echo analysis is carried out by microcontroller 16.

Figure 5:
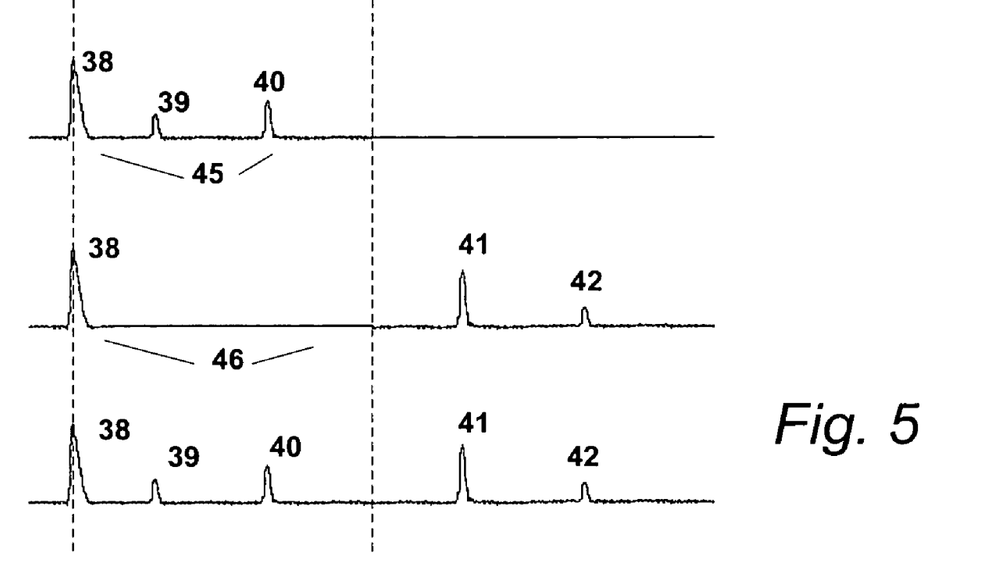
FIG. 5 is a timing diagram for explaining the combination of the two partial echo profiles of FIG. 4 into a total echo profile.

In FIG. 5, the partial echo profiles 45, 46 generated according to the above described manner are illustrated. Both contain reference pulse 38. Besides, partial echo profile 45 comprises echo signals of half of the measurement range, starting at the beginning of the measurement range. Partial echo profile 46 contains echo signals of the other half of the measurement range. A certain overlapping of the two partial echo profiles in the middle of the measurement range can be used, to average the values occurring in the overlapping region.

For the reason that each partial profile 45, 46 has an unambiguous temporal reference point in form of the reference pulse 38, a round trip time evaluation and determination of the reflector distance with respect to the position of the sensor is enabled. The two partial profiles can be combined to a total echo profile, as this is shown in FIG. 5 below. For this, all points of the detected partial echo profiles are brought into coincidence in a common chronological order with respect to reference pulse 38. In the overlapping section of the partial echo profiles, in which points representing the same measured distance are lying, the average value of these points can be used e.g. The total echo profile thus determined then can be analyzed in a known manner.

Figure 6:
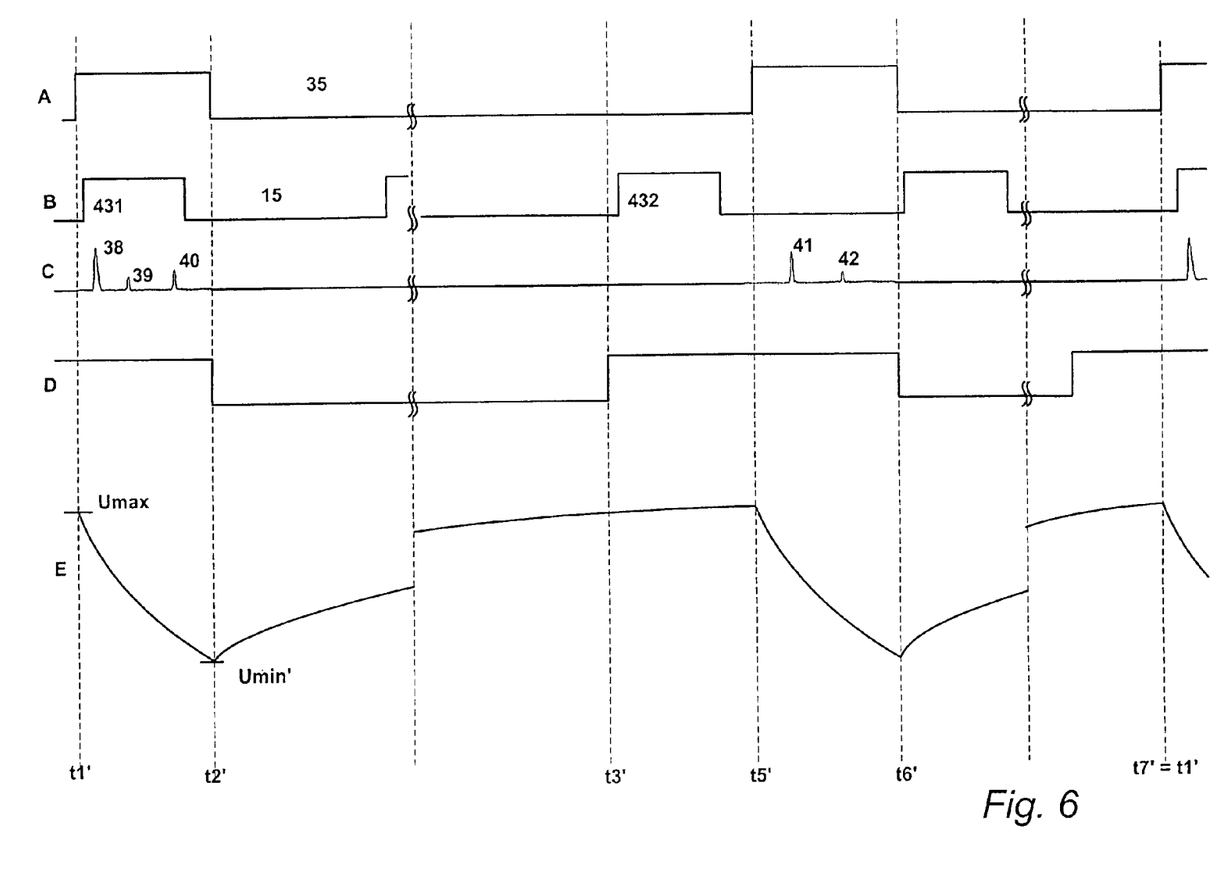
FIG. 6 is a timing diagram of different signals within the sensor of FIG. 1 operated according to the inventive method.

In FIG. 6, the runs of signals correspond to a large extent to the ones shown in FIG. 4, except for the difference that between the points of time t3' and t4', no activation of the transmit/receipt unit 34 is carried out, and thus no reference pulse 38 is generated. To be able to combine the two partial profiles to a total echo profile, as common temporal reference, the differential signal 15, generated simultaneously with each partial profile, is used.

Figure 7:
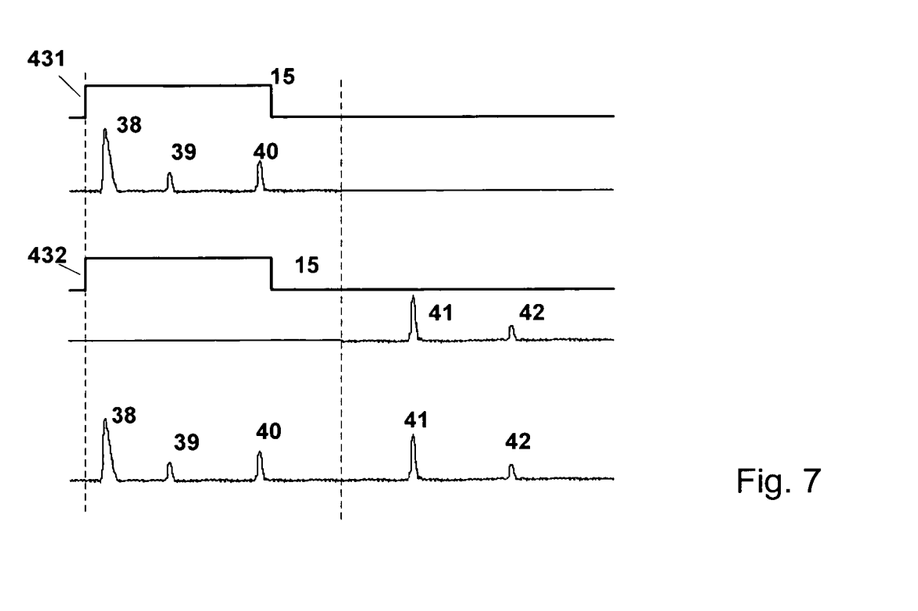
FIG. 7 is a timing diagram for explaining the combination of the two partial echo profiles shown in FIG. 6 into a total echo profile.

This is illustrated in FIG. 7, in which the two partial echo profiles are shown together with the chronologically associated differential signal 15. Slope 431 of differential signal 15 indicates the beginning of the first partial profile with the reference pulse and echoes 39 and 40. Slope 432 indicates the beginning of the second partial profile including echoes 41 and 42. By chronologically referring all points detected in the partial echo profiles back to slopes 431 and 432, respectively, and creating a common order, the total echo profile shown in FIG. 7 below, as a combination of the two partial echo profiles, can be derived.

The microcontroller could e.g. carry out the following steps in a complete measurement cycle, to determine a level of a material: Microcontroller 16 starts the measurement cycle by activating the transmit/receipt unit 34 (t1' in FIG. 6) and verifying the input of differential signal 15 via its interface 17. In case, microcontroller 16 detects the rising slope 431, it starts an internal timer, which at each increment actuates the A/D conversion of the echo profile 37 by A/D converter 22 and the storage of the sampling value in a storage cell, predetermined by the timer counter reading. At a predetermined maximum measurement range of e.g. 80 m and a timer period duration corresponding to a reflector distance change of 1 cm when converted, the timer could count up to a value of e.g. 4100, according to which the value of the echo profile is sensed and stored in a distance of 41 m. For the sake of simplicity, the storage cell could have addresses 1 to 4100 corresponding to the timer values.

Then, controller 16 starts the second phase, deactivating transmit/control unit 34. In this phase, the controller also is in standby mode and energy is stored again in capacitor 32 to recharge it. In case, in t3' sufficient energy is stored to start a new transmission and receipt phase, then microcontroller 16 will no longer remain in standby mode and will verify the differential signal 15 whether the rising slope 432 is present or not. The appearance of the slope again starts the timer, which in turn starts to count up with the same period duration as before. At timer value 4000, controller 16 activates transmit/receipt unit 34 and starts the A/D conversion and storage of the echo profile values into storage cells, corresponding themselves to respective timer values. Because storage cells 4000 to 4100 already contain a digital sampling value, these values are averaged with the values sensed in the second partial phase, and the average value will be stored as a new value in the respective cell.

At timerstand 8000, indicating the maximum measurement distance of 80 m, the transmit/receipt phase (at point of time t6') is terminated, and again energy is stored in that the energy store 32 is recharged during a further interruption. Thereafter, the microprocessor can use a complete echo profile over 80 m measuring distance in storage cells 1 to 8000 to analyze these. The echo of the material to be measured can be determined with respect to its temporal distance to the reference pulse, whereby the calculation of the distance between sensor and material, and thus the level of material in a container, can be calculated, if the container height is known. The measurement cycle is terminated, if sufficient energy is stored again, to start a new measurement cycle.

It has been found that slope 43 is well suitable to combine two or more partial echo profiles in a chronologically correct order.

The inventive method can further be used for level detection radar sensors which are employed for the processing of a large dynamic range and use different amplifications in the receipt path. Thereby, different echo profiles are generated having different echo amplitudes for the same measuring distance. Because the reference pulse mostly has a relatively large amplitude and the echoes form the container are comparatively small, it is sufficient by applying the inventive method to activate the transmit/receipt unit 34 only for storing the reference pulse for a very short time as the pulse occurs, and to thereby save energy.

Figure 8:
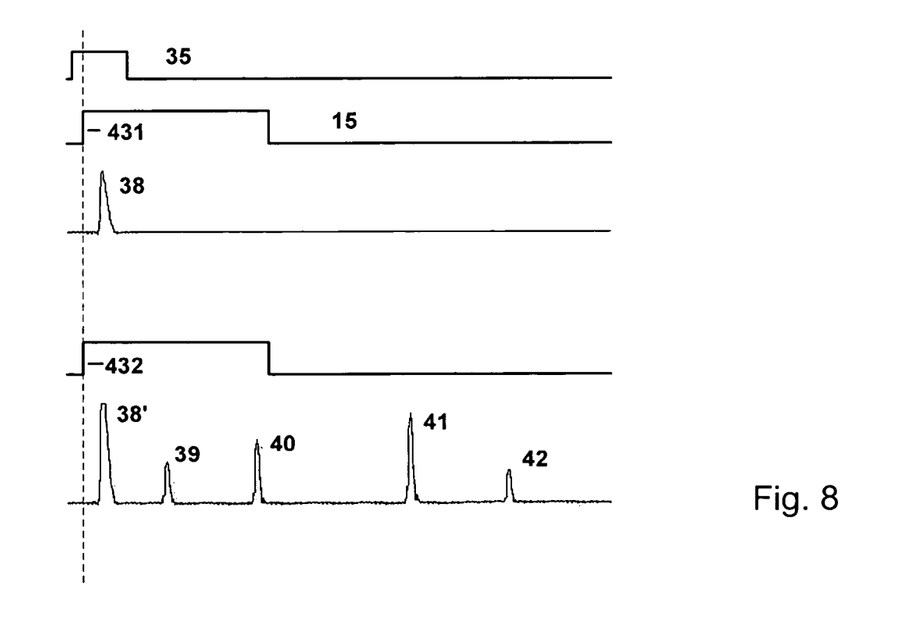
FIG. 8 is a timing diagram for explaining the application of the inventive method according to the operation shown in FIG. 6, when combining partial echo profiles of different amplification.

In FIG. 8 such a procedure is demonstrated. In a first partial phase, the control signal 35 enables for the generation and storing of a short section of the echo profile including the reference pulse. As in FIG. 7, slope 431 serves as temporal reference point. In the second partial phase, being triggered by slope 432, the total echo profile as well as only part of it is generated and stored. The amplification is changed such that even the smallest echoes are visible. Because of this, however, the reference pulse is over-amplified and because of saturation in its amplitude adulterated, such that it is no longer suitable as reference point. By combining both partial profiles on the basis of their reference points 431 and 432, the total echo profile can be derived, comprising both the over-amplified reference pulse as well as the strongly amplified echoes of the container, without the necessity of taking two complete echo profiles with both amplification settings.

Other embodiments are in the scope of the following claims.

The invention claimed is:

1. A method for determining a distance between a radar sensor and a reflection surface of a material, comprising the steps of:
   energizing the radar sensor via a two-wire control loop which allows for data communication and an internal energy store;
   generating an echo profile;
   analyzing the echo profile to calculate the distance,
   wherein the generating step includes a substep of interrupting the generating step at least once to recharge the energy store via the two-wire control loop.

2. The method according to claim 1, wherein the generating step includes at least two partial phases during which the following substep is performed:
   generating respective partial echo profiles corresponding to the partial phases.

3. The method according to claim 2, wherein prior to generating each partial echo profile, the generating step includes the following substep:
   generating and storing a reference pulse to define a uniform temporal reference point of the partial echo profiles.

4. The method according to claim 2, wherein the substep of generating the partial echo profile includes a further substep of
simultaneously generating and storing a differential signal to define a uniform temporal reference point of the partial echo profiles.

5. The method according to claim 2, wherein the generating step includes the following substep:
   combining the partial echo profiles to form a total echo profile using respective uniform temporal reference points of the partial echo profiles.

6. The method according to claim 2, further comprising the step of:
   subdividing a total measurement range of the sensor into at least two partial measurement ranges corresponding to respective partial echo profiles.

7. The method according to claim 2, wherein the substep of generating the partial echo profiles includes the further substeps of:
   activating a transmit/receipt unit of the sensor;
   deactivating the unit upon all interruption of the generating step,
   wherein the interruption is performed when the energy store has not yet completely discharged and a duration of the interruption is selected to allow the energy store to be recharged sufficiently to enable further activation of the unit.

8. The method according to claim 7, wherein, during the interruption, the unit is placed in a standby mode.

9. The method according to claim 2, wherein two adjacent partial echo profiles are partially overlap, the overlapping section being analyzed by averaging measurement values of the respective partial echo profiles coinciding in the overlapping section.

10. The method according to claim 1, wherein during the generating step, a first power is required, the first power being greater than a second power provided by the two-wire control loop.

11. The method according to claim 1, wherein the two-wire control loop provides a current between 4 and 20 mA.

12. The method according to claim 1, wherein the generating step includes two partial phases, each of the two partial phases corresponding to one half of a measurement range of the sensor.

13. The method according to claim 1, wherein the analyzing step is performed by a microcontroller.

14. The method according to claim 1, wherein the echo profile includes a reference signal and a plurality of echo signals and wherein a timer is used to store signal values of a sampled echo profile in storage cells corresponding to respective counter readings of the timer.

15. The method according to claim 1, further comprising the step of:
   calculating a level of material in a container as a function of the calculated distance.

16. A method for determining a distance between a two-wire radar sensor and a reflection surface of a material, comprising the steps of:
   generating an echo profile; and
   analyzing the echo profile to calculate the distance,
   wherein the generating step includes the following substeps:
   activating a transmit/receipt circuit;
   generating and storing a temporal reference point by generating a reference pulse;
   generating and storing a first partial profile of the echo profile corresponding to a first measurement range of the sensor;
   deactivating the transmit/receipt circuit until an energy store of the sensor is at least partially recharged;

activating the transmit/receipt circuit;
generating and storing the temporal reference point by generating the reference pulse;
generating and storing a second partial profile of the echo profile corresponding to a second partial measurement range of the sensor; and
deactivating the transmit/receipt circuit until the energy store is at least partially recharged.

17. The method according to claim 16, wherein the analyzing step includes the following substeps:
combining the two partial echo profiles to form a total echo profile covering the first and second measurement ranges using the respective temporal reference points;
evaluating a round trip time of an echo based on the reference pulse; and
calculating the distance between the sensor and the reflecting surface of the material using a microcontroller.

18. The method according to claim 16, wherein the partial echo profiles overlap in regions adjacent to each other and wherein the measured values corresponding to each other in the overlapping section are averaged.

19. A method for determining a distance between a two-wire radar sensor and a reflection surface of a material, comprising the steps of:
generating an echo profile; and
analyzing the echo profile to calculate the distance,
wherein the generating step includes the following substeps:
activating the transmit/receipt circuit;
generating, verifying and storing a differential signal using a microcontroller, a frequency of the differential signal corresponding to a frequency difference between a first oscillator generating transmission pulses and a second oscillator generating sampling pulses;
generating and storing a reference pulse and a first partial echo profile corresponding to a first partial measurement range of the sensor;
deactivating the transmit/receipt circuit until an energy store of the sensor is at least partially recharged, the energy store energizing the transmit/receipt circuit;
verifying the differential signal using the microcontroller;
generating and storing a second partial echo profile corresponding to a second partial measurement range of the sensor.

20. The method according to claim 19, wherein the analyzing step includes the substeps of:
combining the partial echo profiles to form a total echo profile covering the first and second measuring ranges by using respective differential signals of the partial echo profiles;
determining a round trip time of an echo based on a reference pulse; and
calculating the distance between the sensor and the reflecting surface of the material using the microcontroller.

21. The method according to claim 19, wherein the partial echo profiles overlap in regions being adjacent to each other and wherein the measured values corresponding to each other in the overlapping section are averaged.

22. The method according to claim 19, wherein the differential signal has a rising slope which serves as a reference point for the beginning of a respective partial echo profile.

23. A radar sensor for determining a distance to a reflection surface of a material, comprising:
a power supply unit having a two-wire control loop and an internal energy store, the energy store energizing the sensor;
an echo profile generator for generation of an echo profile; and a transmit/receipt circuit;
a microcontroller controlling, during generation of an echo profile, a voltage of the energy store by activating/deactivating the transmit/receipt circuit, the microcontroller interrupting the generation of the echo profile at least once to recharge the energy store and analyzing the echo profile to calculate the distance.

24. The radar sensor according to claim 23, wherein the energy store includes one of a capacitor and an accumulator and wherein the two-wire control loop provides a current in a range between 4 and 20 mA.

25. The radar sensor according to claim 23, further comprising:
an arrangement mixing (i) output data of a first oscillator of a frequency control unit and (ii) output data of a second oscillator of the frequency control unit to generate a differential signal,
wherein the first oscillator generates transmission pulses and the second oscillator generates sampling pulses.

26. A method for determining a distance between a radar sensor and a reflection surface of a material, comprising the steps of:
energizing the sensor via a two-wire control loop which allows data communication and an internal energy store;
generating an echo profile; and
analyzing the echo profile to calculate the distance as a function of measured data,
wherein the generating step is interrupted at least once to recharge the energy store,
wherein the generating step includes at least two shorter partial phases and includes the substep of generating, during the partial phases, respective partial echo profiles,
wherein, during the generating step, a first power is required, the first power being greater than a second power provided by the two-wire control loop, and
wherein, a uniform temporal reference point is generated using each partial echo profile.

27. The method according to claim 26, wherein the first partial echo profile includes a reference pulse and the second partial echo profile includes pulses of the reflection surface of the material, the first partial echo profile being subject to a first amplification and the second partial echo profile being subject to a second amplification, the second amplification being larger than the first amplification.

* * * * *